United States Patent [19]

Quang et al.

[11] Patent Number: 4,897,089

[45] Date of Patent: Jan. 30, 1990

[54] PARTIAL OXIDATION BURNER FOR PRODUCING SYNTHETIC GASES

[75] Inventors: Dang V. Quang, Neuilly sur Seine; Alain Feugier, Orgeval; Paul Gateau, Saint Nom La Breteche; Bernard Poussin, Carrieres sur Seine, all of France

[73] Assignee: Institut Francais du Petrole, Rueil Malmaison, France

[21] Appl. No.: 212,690

[22] Filed: Jun. 28, 1988

[30] Foreign Application Priority Data

Jun. 30, 1987 [FR] France ............................. 87 09268

[51] Int. Cl.$^4$ ............................. C01B 3/36; C10J 3/50
[52] U.S. Cl. ................................. 48/86 R; 48/196 R; 48/DIG. 7; 239/424.5; 239/549
[58] Field of Search .................. 48/196 R, 212, 86 R, 48/DIG. 4, DIG. 7, 61, 95, 107; 239/424.5, 425, 425.5, 549; 431/354, 177, 187

[56] References Cited

U.S. PATENT DOCUMENTS 3,204,682  9/1965  Teleshefsky et al. ............ 239/424.5

Primary Examiner—Joye L. Woodard
Attorney, Agent, or Firm—Antonelli, Terry & Wands

[57] ABSTRACT

The present invention provides a burner for the partial oxidation under pressure of a first fluid by the second fluid. This burner comprises two fluid introduction tubes, one being internal to the other, with each of the tubes comprising a plate, and with each plate having several holes and a plate of the external tube has holes placed opposite the holes in the internal plate.

14 Claims, 1 Drawing Sheet

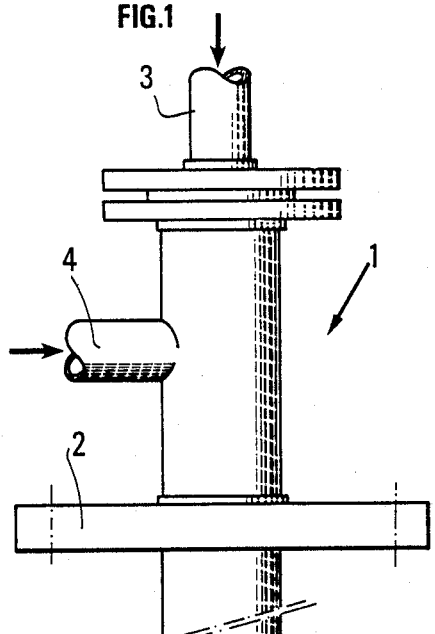
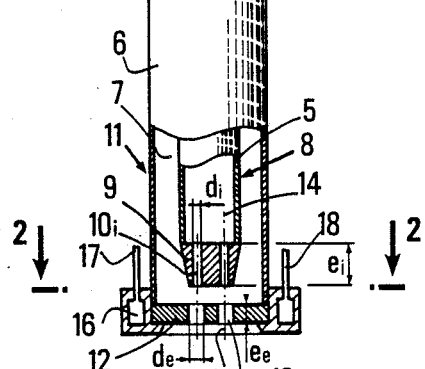
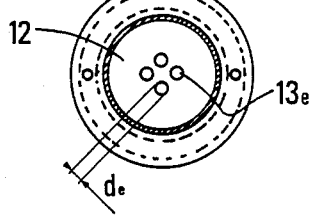
FIG.1
FIG.2
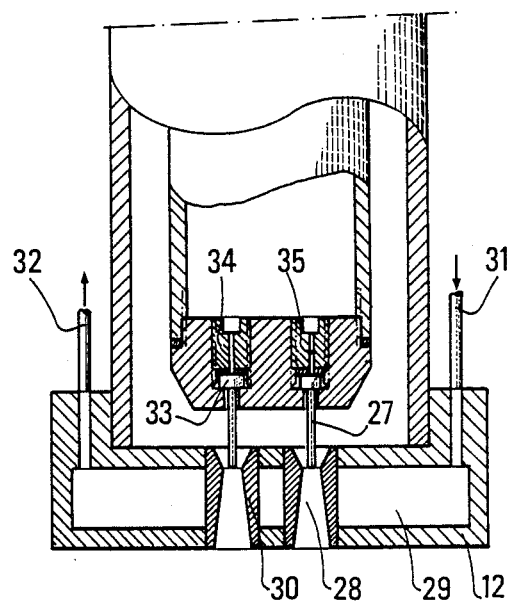
FIG.4
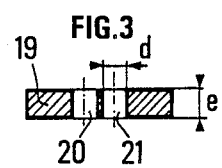
FIG.3
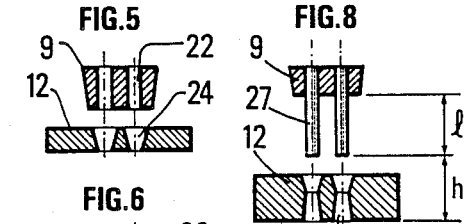
FIG.5 FIG.8
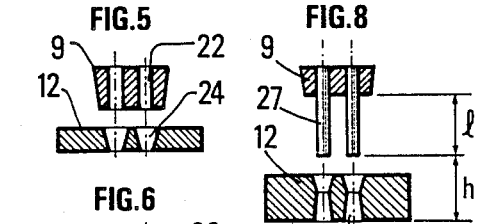
FIG.6
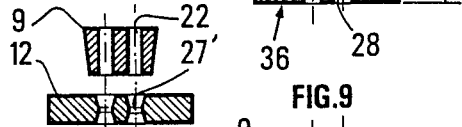
FIG.7
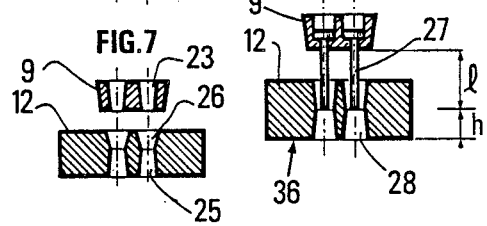
FIG.9

PARTIAL OXIDATION BURNER FOR PRODUCING SYNTHETIC GASES

BACKGROUND OF THE INVENTION

The present invention relates to a burner for partial oxidation intended mainly for producing synthetic gas.

The burner of the present invention is particularly well adapted for operation in a pressurized reactor or furnace and provides homogenous distribution of the fuel and/or of the oxidizer such as oxygen. In addition, the burner of the invention is modular and has a behaviour which can be readily extrapolated.

Thus, the adjustment costs can be reduced not only from the point of view of time but also that of price, which are often high for a large installation.

The prior art may be illustrated by the patents U.S. Pat. No. 3,224,679, 3,989,444 and 3,945,942.

SUMMARY OF THE INVENTION

The burner of the invention comprises two tubes which are preferably substantially coaxial and serve as pipes for feeding the oxidizer and the fuel or fuels.

The oxidizer may be either air, or oxygen or else enriched air.

Fuel which is hydrocarbon or coal based-mixture may be either a gas, or liquid, or else a powdery solid in suspension, in a liquid phase or else gas phase, or else in a mixture of two or more of these phases.

The two tubes are each capped at their outlet ends by a perforated plate, such as a disk when the tubes are cylindrical.

In the same plate or disk, the holes will be preferably identical and evenly spaced apart.

The perforated holes may be either cylindrical in shape or in the shape of a truncated cone or a convergent-divergent feed possibly with a cylindrical portion.

The ratio between d, the smallest circular section diameter of the perforation hole (diameter either of the cylinder, or of the small base of the truncated cone, or else of the neck of the convergent-divergent portion) and e, thickness of the perforated disk may be such that:

$$0.01 \leq d/e \leq 100$$

preferably:

$$0.1 \leq d/e \leq 10$$

The two disks or plates may have the same number of holes. Each hole in the inner plate or disk will have a corresponding one on the outer plate or disk.

Furthermore, two corresponding holes may be advantageously placed facing each other and coaxial.

The ratio of diameters d, namely $d_e$ for the outer disk and $d_i$ for the inner disk may be such that: $1 \leq d_e/d_i \leq 10$, with $d_i \leq 100$ mm, and, preferably, $\leq 80$ mm.

The discs or plates may be made either from steel, or from ceramics, with carbide, nitride or oxide base. These refractory compounds may be formed either with aluminium, magnesium, silicium, titanium or zirconium, or else from a mixture of two or more of these compounds. The compounds may be originally either natural such as corindon or cordierite, or synthetic, such as silicon carbide for example.

The plates may be obtained either by machining, or by moulding, or else by the so-called sintering technique.

It is also possible in accordance with the present invention to extend the holes in the inner plates by tubes having the same inner diameter as the holes, with an axial length or extension l of the extension tubes being such that:

$$0.1 \leq l/d_i \leq 200, \text{ and, preferably,}$$

$$0.5 \leq l/d_i \leq 50.$$

These extension tubes may comprise the same materials as those mentioned above for the plates.

Furthermore, if h is the distance between the end of the tube and the external face of the outer disk, the following relationship exists:

$$0 \leq h/d_e \leq 10.$$

More generally, the present invention relates to a burner for causing under pressure the partial oxidation of a first fluid by a second fluid. The burner of the invention comprises two fluid introduction tubes, one being internal to the other. The burner is characterised more particularly in that each of said tubes comprises a plate, with each plate having several holes and the plate of the external tube comprises holes placed opposite the holes in the internal plate.

Fluids may be gaseous fluids. One at least of the plates may have a thickness e and comprise holes whose smallest flow section has a hydraulic diameter d, and be such that the ratio of this diameter to this thickness is between 0.01 and 100 or preferably between 0.1 and 10, boundaries included, namely: $0.1 \leq d/e \leq 100$, and, preferably, $0.1 \leq d/e \leq 10$.

Preferably, both plates will have this characteristic. The internal plate may comprise holes whose hydraulic diameter is $d_i$, the external plate comprising holes whose hydraulic diameter is $d_e$, the holes in the internal plate being opposite said holes in the external plate and the ratio of the hydraulic diameter of the holes in the external plate to that of the holes in the internal plate may be between 1 and 10, boundaries included.

$$1 \leq d_e/d_i \leq 10.$$

The holes in the internal plate may be extended by tubes having the same section and the ratio between the extension length l of said tubes and the internal hydraulic diameter may be between 0.1 and 200 and preferably between 0.5 and 50, boundaries included, namely: $0.1 \leq l/d_i \leq 200$, and, preferably, $0.5 \leq l/d_i \leq 50$.

If h is the distance between the end of an extension tube and the external face of the external plate, the ratio of this distance to the diameter $d_e$ of the corresponding hole in the external plate may be between 0 and 10, boundaries included, namely:

$$0 \leq h/d_e \leq 10.$$

The external plate may have the same number of holes as the internal plate.

One at least of the tubes may be cylindrical, and the corresponding plate may be in the form of a disk.

At least one of the holes in the internal plate may have a form of revolution such as that of a right cylinder, a form of revolution of a truncated cone or the form of a convergent-divergent possibly comprising an intermediate straight portion.

One of the holes in the outer plate may have the form of a convergent-divergent, the corresponding hole in the internal plate may be extended by a tube and the extension tube may penetrate into the hole in the external plate and stop substantially at the level of the neck of the convergent-divergent portion.

One at least of the internal plates may comprise cooling means.

One at least of said internal or external plates may comprise steel, carbide, nitride or oxide based ceramics, these refractory compounds mainly comprise either aluminium, magnesium, silicium, titanium or else zirconium, or else a mixture of two or more of these compounds.

The present invention may be in particular applied to partial oxidation of natural gas or a liquid oil fraction.

BRIEF DESCRIPTION OF THE DRAWINGS

The present invention will be better understood and its advantages will be clear from the following description of particular non-limitative examples illustrated by the figures in which:

FIG. 1 is a partial cross-sectional longitudinal view of a burner constructed in accordance with the present invention;

FIG. 2 is a cross-sectional view taken along the line 2—2 in FIG. 1;

FIG. 3 is a cross-sectional view of a plate for the burner of FIG. 1;

FIG. 4 is a partial cross-sectional view of a burner having a plate comprising a cooling box; and FIGS. 5–9 are cross-sectional views of different embodiments of the plate with which the burner of the present invention may be equipped.

DESCRIPTION OF THE PREFERRED EMBODIMENTS

The burner of the invention may be used for manufacturing synthetic gas for example from partial oxidation of natural gas using oxygen.

Referring now to the drawings wherein like reference numerals are used throughout the various views to designate like parts and, more particularly, to FIG. 1, according to this figure, a burner generally designated by the reference numeral 1 comprises a fixing flange 2 for fixing the burner 1 to a reactor or furnace, with the burner 1 including a first orifice 3 for introducing a first gas and a second orifice 4 for introducing a second gas. Oxygen may be introduced either through the first orifice 3 or through the second orifice 4 and natural gas will be introduced through the remaining available orifice, namely, orifice 4 or orifice 3. The first orifice 3 supplies the space defined by an internal portion of a first or internal tube 5.

The internal tube 5 is situated in a second tube or external tube 6, with the second orifice 4 supplying the annular space 7 defined by an external wall of the internal tube 5 and an internal wall of the external tube 6.

An end generally designated by the reference numeral 8 of the internal tube 5 comprises an internal plate 9 of thickness $e_i$, with so-called internal plate having several holes $10_i$ of a diameter $d_i$ only some of which are shown in the respective figures for clarity. the different figures so as not to overload them.

An end generally designated by the reference numeral 11 of the external tube 6 comprises a so-called external plate, with the external plate 12 having a thickness $e_e$ comprising holes $13_e$ of a diameter $d_e$, with only some of the holes $13_e$ being illustrated in the drawings. Each hole $10_i$ in the internal plate 9 is placed opposite a hole $13_e$ in the external plate 12. Thus, the number of holes $13_e$ in the external plate 12 is at least equal to the number of holes $10_i$ in the internal plate 9. Preferably, an axis 14 of the internal hole $10_i$ merges substantially with the axis 15 of a corresponding external hole $13_e$.

As shown in FIG. 1 where the internal 5 and external 6 tubes are substantially coaxial, the external plate 12 is surrounded by a water chamber 16 for the circulation of a cooling fluid, with the flow of cooling fluid being provided through ducts 17, 18.

As shown in FIG. 3, illustrating the geometric sizes used in the present invention a plate 19, which may be either the internal plate or the external plate, with the plate 19 having two orifices 20, 21.

In accordance with the present invention, the ratio of d/e is such that: $0.01 \leq d/e \leq 100$, and, preferably, $0.1 \leq d/e \leq 10$, either for the internal plate or the external plate.

Furthermore, in accordance with the present invention the ratio $d_e/d_i$ may be such that $1 \leq d_e/d_i \leq 10$, particularly for orifices having a diameter of less than 100 mm and, preferably, less than 80 mm.

In FIGS. 5 and 6, the holes 22 in the first plate 9 are cylindrical, whereas, in FIG. 7, the holes 23 in the internal plate 9 have a truncated cone shape.

The holes 24 in the external plate 12 have a truncated cone shape in FIG. 5. In FIG. 7, the holes 25 in the second plate are in the form of a venturi comprising a convergent portion followed by a divergent portion considering the flow direction. At the connection level of the convergent portion and the divergent portion, a neck 26 is formed.

In FIG. 6, a cylindrical intermediate part 27' is provided for connecting the convergent portion to the divergent portion.

In the case of the hole having a convergent portion and/or a divergent portion, the diameter to be considered for the above "ranges" of values is the diameter of the neck corresponding to the smallest diameter.

FIGS. 4, 8 and 9, illustrate the case where the holes in the internal plate 9 comprise extension tubes 27, with holes 28 in the external plate 12 comprising a convergent-divergent portion 28.

In the case of FIGS. 4 and 9, the extension tubes 27 penetrate into the holes 28 in the external plate 12.

In FIG. 4, plate 12 itself defines the shape of a water chamber 29 and the flow holes 28 are defined by added pieces 30.

Ducts 31 and 32 serve for the flow of the coolant fluid through the water chamber 29.

In FIG. 4, the extension tubes 27 have a base 33 which is held in position by a threaded plug 34 having a passage 35 of diameter $d_i$ for the flow of the fluid to be injected.

In a variant of the present invention, it will be advantageous to have the ratio $1/d_i$ such that: $0.1 \leq 1/d_i \leq 200$, and, preferably, $0.5 \leq 1/d_i \leq 50$, where l corresponds to a height of the extension tube.

In another variant of the present invention which may be combined with the above-described embodiments, it is also possible to realize the following relationship:

$$0 \leq h/d_e < 10,$$

where: h=a distance between an end of the extension tube and an external face 36 of the external plate 12.

What is claimed is:

1. A burner for partial oxidation under pressure of a first fluid by a second fluid, the burner including two gas introduction tube means for respectively introducing one of said first and second fluids, one of said two gas introduction tube means being disposed internally of the other of said two gas introduction tube means such that said one of said gas introduction tube means forms an internal tube and said other of said gas introduction tube means forms an external tube, each of said gas introduction tube means comprises a plate mounted at one end thereof, each said plate includes a plurality of cylindrical through hole means for enabling a flow of the respective fluids from the two gas introduction tube means therethrough, and wherein the through hole means in the plate mounted at one end of the external tube are disposed in opposition to the through holes means in the plate mounted on the end of the internal tube.

2. The burner as claimed in claim 1, wherein one of said plates has a thickness e and the through hole means in said one plate has a smallest flow section with a hydraulic diameter d, and wherein a ratio of the hydraulic diameter d to the thickness e is:

$$0.01 \leq d/e \leq 100.$$

3. The burner as claimed in claim 2, wherein the ratio of hydraulic diameters d to the thickness e is between $0.1 \leq d/e \leq 10$.

4. The burner as claimed in claim 1 wherein the through hole means in the plate mounted on the end of the internal tube has a hydraulic diameter $d_i$, the through hole means in the plate mounted on the end of said external tube has a hydraulic diameter $d_e$, and, wherein a ratio of the hydraulic diameter $d_e$ to the hydraulic diameter $d_i$ is:

$$1 \leq d_e/d_i \leq 10.$$

5. The burner as claimed in claim 1, wherein the through hole means in the plate mounted on the end of the internal tube include cylindrical extension tube means mounted therein having an internal hydraulic diameter the same as an internal hydraulic diameter of the through hole means in the plate mounted on the end of the internal tube, and wherein a ratio between an axial extension length l of said extension tube means and the internal hydraulic diameter $d_i$ of the through hole means in the plate mounted on the end of the internal tube is:

$$0.1 \leq l/d_i \leq 200.$$

6. The burner as claimed in claim 5, wherein a ratio between a distance h extending between a downstream end of the extension tube means and a downstream face of the plate mounted on the external tube and a diameter $d_e$ of the through hole means in the plate mounted on the end of the external tube is:

$$0 \leq h/d_e \leq 10.$$

7. The burner according to claim 5, wherein the ratio between the axial extension length l and the hydraulic diameter $d_i$ is between $0.5 \leq l/d_i \leq 50$.

8. The burner as claimed in claim 1, wherein said through hole means in the plate mounted on the end of the external tube has a convergent-divergent portion, and extension tube means are mounted therein for extending an axial length of the through hole means in the plate mounted on the internal tube so as to penetrate into the through hole means in the plate mounted on the end of the external tube, and wherein the extension tube means terminates substantially at a level of a neck of the convergent-divergent portion.

9. The burner as claimed in claim 8, wherein the convergent-divergent portion includes an intermediate straight portion.

10. The burner as claimed in one of claims 1, 2, 4, 5, or 6, further comprising means for cooling the plate mounted on the end of the external tube.

11. The burner as claimed in claim 10, wherein at least one of said plates comprises steel or a refractory compound comprising a carbide, nitride or oxide of aluminum, magnesium, silicium, titanium or zirconium.

12. The burner as claimed in claim 11, wherein the refractory compound comprises a mixture of at least two of the listed compounds.

13. The burner as claimed in one of claims 1, 2, 4, 5, or 6 wherein at least one of said internal and external tubes is cylindrical, and wherein the plate mounted on said at least one of said internal and external tubes is in the form of a disk.

14. The burner as claimed in one of claims 1, 2, 4, 5, or 6, wherein at least one of said cylindrical through hole means provided in the plate mounted on at least one of the internal and external tubes has a form of a right cylinder, a truncated cone, or a convergent-divergent portion.

* * * * *